US009778347B2

(12) United States Patent
Kotani

(10) Patent No.: US 9,778,347 B2
(45) Date of Patent: Oct. 3, 2017

(54) TARGET HOLDING JIG AND MEASUREMENT APPARATUS

(71) Applicant: MITSUBISHI HITACHI POWER SYSTEMS, LTD., Kanagawa (JP)

(72) Inventor: Kosuke Kotani, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 295 days.

(21) Appl. No.: 14/442,551

(22) PCT Filed: Jan. 10, 2014

(86) PCT No.: PCT/JP2014/050361
§ 371 (c)(1),
(2) Date: May 13, 2015

(87) PCT Pub. No.: WO2014/112443
PCT Pub. Date: Jul. 24, 2014

(65) Prior Publication Data
US 2016/0291133 A1 Oct. 6, 2016

(30) Foreign Application Priority Data
Jan. 16, 2013 (JP) .................................. 2013-005667

(51) Int. Cl.
*G01C 3/08* (2006.01)
*G01S 7/481* (2006.01)
(Continued)

(52) U.S. Cl.
CPC ............ *G01S 7/481* (2013.01); *G01B 5/0004* (2013.01); *G01B 11/24* (2013.01); *G01B 21/047* (2013.01); *G01C 15/06* (2013.01)

(58) Field of Classification Search
CPC ...... G01B 21/047; G01B 11/24; G01B 5/004; G01B 5/0004; G01C 15/06; G01S 7/481
(Continued)

(56) References Cited
U.S. PATENT DOCUMENTS 6,219,931 B1 * 4/2001 Roth .................... G01B 5/0004
33/573
6,667,798 B1 12/2003 Markendorf et al.
(Continued)

FOREIGN PATENT DOCUMENTS

CN 202281855 6/2012
JP 8-219790 8/1996
(Continued)

OTHER PUBLICATIONS

Notification for Patent Registration Formalities dated Sep. 8, 2015 in Chinese Application No. 201480000943.2, with English translation.
(Continued)

*Primary Examiner* — Mark Hellner
(74) *Attorney, Agent, or Firm* — Wenderoth, Lind & Ponack, L.L.P.

(57) ABSTRACT

The target holding jig which holds a spherical target including a reflection mechanism for reflecting measurement light emitted from a light source, and brings the target and an end surface of an object to be measured into contact with each other, includes a supporting portion configured to support the target being in contact with the object to be measured, a guide portion disposed on a side of the supporting portion facing the object to be measured, regulating a contact position of the target with the object to be measured in a short side direction of the end surface of the object to be measured, and restricting the movement of the target in the short side direction of the end surface of the object to be
(Continued)

measured, and a coupling portion fixed to the supporting portion, and removably coupled to the object to be measured.

7 Claims, 7 Drawing Sheets

(51) Int. Cl.
  *G01B 21/04* (2006.01)
  *G01B 5/00* (2006.01)
  *G01C 15/06* (2006.01)
  *G01B 11/24* (2006.01)

(58) Field of Classification Search
  USPC .......................................................... 356/4.01
  See application file for complete search history.

(56) References Cited

U.S. PATENT DOCUMENTS

| | | | | |
|---|---|---|---|---|
| 8,493,554 | B2* | 7/2013 | Arnold | B64C 1/064 |
| | | | | 356/3.01 |
| 2011/0279809 | A1* | 11/2011 | Arnold | B64C 1/064 |
| | | | | 356/4.01 |
| 2013/0162971 | A1* | 6/2013 | Winter | G01C 3/08 |
| | | | | 356/4.01 |
| 2015/0308826 | A1* | 10/2015 | Seki | G01C 15/06 |
| | | | | 33/293 |

FOREIGN PATENT DOCUMENTS

| | | |
|---|---|---|
| JP | 10-246635 | 9/1998 |
| JP | 11-153438 | 6/1999 |
| JP | 2011-39052 | 2/2011 |
| JP | 2012-137382 | 7/2012 |
| JP | 2012-237661 | 12/2012 |
| WO | 90/13002 | 11/1990 |

OTHER PUBLICATIONS

Notification on the Grant of Patent Right for Invention dated Sep. 8, 2015 in Chinese Application No. 201480000943.2, with English translation.
Extended European Search Report dated Oct. 15, 2015 in corresponding European Application No. 14740705.0.
English translation of the Written Opinion of the International Searching Authority dated Mar. 11, 2014 in International (PCT) Application No. PCT/JP2014/050361.
Communication under Rule 71(3) EPC dated Nov. 22, 2016 in corresponding European Application No. 14 740 705.0.
Notice of Allowance dated Jun. 30, 2015 in corresponding Korean Application No. 10-2015-7012509, with partial English translation.
Chinese Office Action dated Mar. 31, 2015 in corresponding Chinese Patent Application No. 201480000943.2, with English translation.
International Search Report dated Mar. 11, 2014 in International (PCT) Application No. PCT/JP2014/050361.
Notice of Allowance dated Sep. 2, 2014 in corresponding application No. JP 2013-005667, along with English translation.

* cited by examiner

TARGET HOLDING JIG AND MEASUREMENT APPARATUS

FIELD

The present invention relates to a target holding jig for holding a spherical target brought into contact with an object to be measured, and a measurement apparatus.

BACKGROUND

Examples of measurement apparatuses for measuring a distance to an object to be measured include an apparatus for measurement using measurement light. For example, Patent Literature 1 discloses an absolute distance meter including a light source for outputting a radiation beam (measurement light), a target including an external retroreflector for reflecting the measurement light, a light receiving unit integrally fixed with the light source and receiving the light reflected from the target, and a signal processing unit for analyzing the light received by the light receiving unit to calculate a distance to the target. While the target is in contact with the object to be measured, the absolute distance meter irradiates the target with the measurement light from the light source, receives the light reflected from the target by the light receiving unit, analyzes the received light, and calculates the distance to the target, and thereby can measure the distance to the object to be measured with which the target is in contact.

Patent Literature 2 discloses, as a jig for holding a spherical reflector (target) used for measurement of a bending angle of a rod-shaped workpiece (pipe) such as a cylindrical body or a columnar body, a jig including a pair of semi-circular jig component bodies formed with an outward groove for slidably holding the spherical reflector, and combined with each other to be fitted and mounted on an outer periphery of the pipe. In Patent Literature 2, the target is moved along the jig to facilitate measurement of the bending angle of the rod-shaped workpiece, and further to enable recording of the bending angle of the rod-shaped workpiece for each portion to be measured.

CITATION LIST

Patent Literature

Patent Literature 1: Japanese Laid-open Patent Publication No. 2011-39052
Patent Literature 2: Japanese Laid-open Patent Publication No. 2012-137382

SUMMARY

Technical Problem

When a distance to an object to be measured is measured using an apparatus as described in Patent Literature 1, a target out of contact with the object to be measured does not allow accurate measurement of a distance to the object to be measured or a bending angle of a portion to be measured.

A plate-shaped member such as a seal fin of a steam turbine may be selected as the object to be measured. When an end surface of the plate-shaped member such as the seal fin is measured, the object to be measured has a thin thickness, unlike a rod-shaped workpiece such as a cylindrical body or a columnar body. Since the target has a spherical shape, when the target is brought into contact with the object to be measured, or when the target is moved along the object to be measured, a contact position of the target tends to shift in a thickness direction (plate thickness direction) of the object to be measured. When the contact position of the target is thus shifted, the plate-shaped object to be measured is brought into contact with the spherical target in a direction shifted from a normal line extending toward the center of the spherical target, and measurement error occurs.

The present invention has been made to solve the above-mentioned problem, and it is an object of the present invention to provide a target holding jig and a measurement apparatus which can bring a target into contact with an object to be measured highly accurately.

Solution to Problem

According to an aspect of the present invention, there is provided a target holding jig to achieve the above object which holds a spherical target including a reflection mechanism for reflecting measurement light emitted from a light source, and brings the target and an end surface of an object to be measured into contact with each other, the target holding jig comprising: a supporting portion configured to support the target being in contact with the object to be measured; a guide portion which is disposed on a side of the supporting portion facing the object to be measured, and configured to regulate a contact position of the target with the object to be measured in a short side direction of the end surface of the object to be measured, and configured to restrict the movement of the target in the short side direction of the end surface of the object to be measured; and a coupling portion fixed to the supporting portion, and removably coupled to the object to be measured.

Accordingly, the coupling portion is coupled to an object to be measured, and the guide portion regulates the relative positions of the target and the object to be measured, so that the target can be brought into contact with the object to be measured highly accurately. Additionally, as the coupling portion is removably coupled to the object to be measured, one target holding jig and one target can be used for measurement at a plurality of measurement points.

In the target holding jig of the present invention, the coupling portion is coupled to the object to be measured by holding the object to be measured.

Accordingly, the coupling portion holds the object to be measured and is thus coupled to the object to be measured, which allows easy attachment and detachment.

The target holding jig of the present invention further comprises: a detection unit configured to detect contact between the target and the object to be measured; and a notification unit configured to notify that the detection unit has detected the contact between the target and the object to be measured.

Accordingly, the target can be brought into contact with the object to be measured more securely, and thus measurement precision can be further increased.

In the target holding jig of the present invention, the detection unit includes a power source connected to the target and the coupling portion, and the target, the coupling portion, the power source, and the notification unit are connected in series, and when the target and the coupling portion are brought into contact with the object to be measured, the target, the coupling portion, the power source, the notification unit, and the object to be measured form a closed circuit, so that a current flows to the notification unit.

Accordingly, only positional adjustment, which is performed while bringing the coupling portion into contact with the object to be measured in order to couple the target holding jig with the object to be measured, is required to recognize whether the target has been brought into contact with the object to be measured.

The target holding jig of the present invention further comprises: an insulation portion which is disposed between the supporting portion and the coupling portion, and configured to insulate between the supporting portion and the coupling portion.

Accordingly, owing to this configuration, the coupling portion and the target are inhibited from being electrically connected with each other at a part other than a circuit.

In the target holding jig of the present invention, the notification unit is a light emitting unit configured to emit light.

Accordingly, it is easy to visually recognize whether the target and the object to be measured have been brought into contact with each other.

According to another aspect of the present invention, a measurement apparatus comprises: any one of the target holding jigs described above; a target held by the target holding jig; and a measurement apparatus body including: a light source configured to irradiate the target with measurement light; a light receiving unit configured to receive the light reflected from the target; and a processing unit configured to analyze a result of the light received by the light receiving unit.

Accordingly, since the target and the object to be measured can be brought into contact with each other highly accurately, or since positional shift can be inhibited, a distance to the object to be measured can be measured highly accurately.

Advantageous Effects of Invention

According to the target holding jig and the measurement apparatus of the present invention, an object to be measured, such as a plate-shaped member, for example, a seal fin of a steam turbine, and the coupling portion are coupled to each other, and the guide portion regulates the relative positions of the target and the object to be measured, so that the target can be highly accurately brought into contact with the object to be measured, such as a plate-shaped member, for example, a seal fin of a steam turbine.

DESCRIPTION OF EMBODIMENTS

The present invention will be described below in detail with reference to the drawings. It is noted that the present invention is not limited to this embodiment. Components in the embodiment described below include components readily assumed by those skilled in the art or substantially the same components. For example, in the embodiment described below, a target holding jig and a measurement apparatus according to the present invention will be described with an example of measurement of an end surface on the inner peripheral side of a ring-shaped seal fin of a steam turbine, but an object to be measured is not limited to this example. The target holding jig and the measurement apparatus according to the present invention show a more remarkable effect when the seal fin is selected as the object to be measured, but can also be preferably used for measurement of the position of an end surface of a thin plate-shaped object to be measured, similar to the seal fin.

Figure 1:
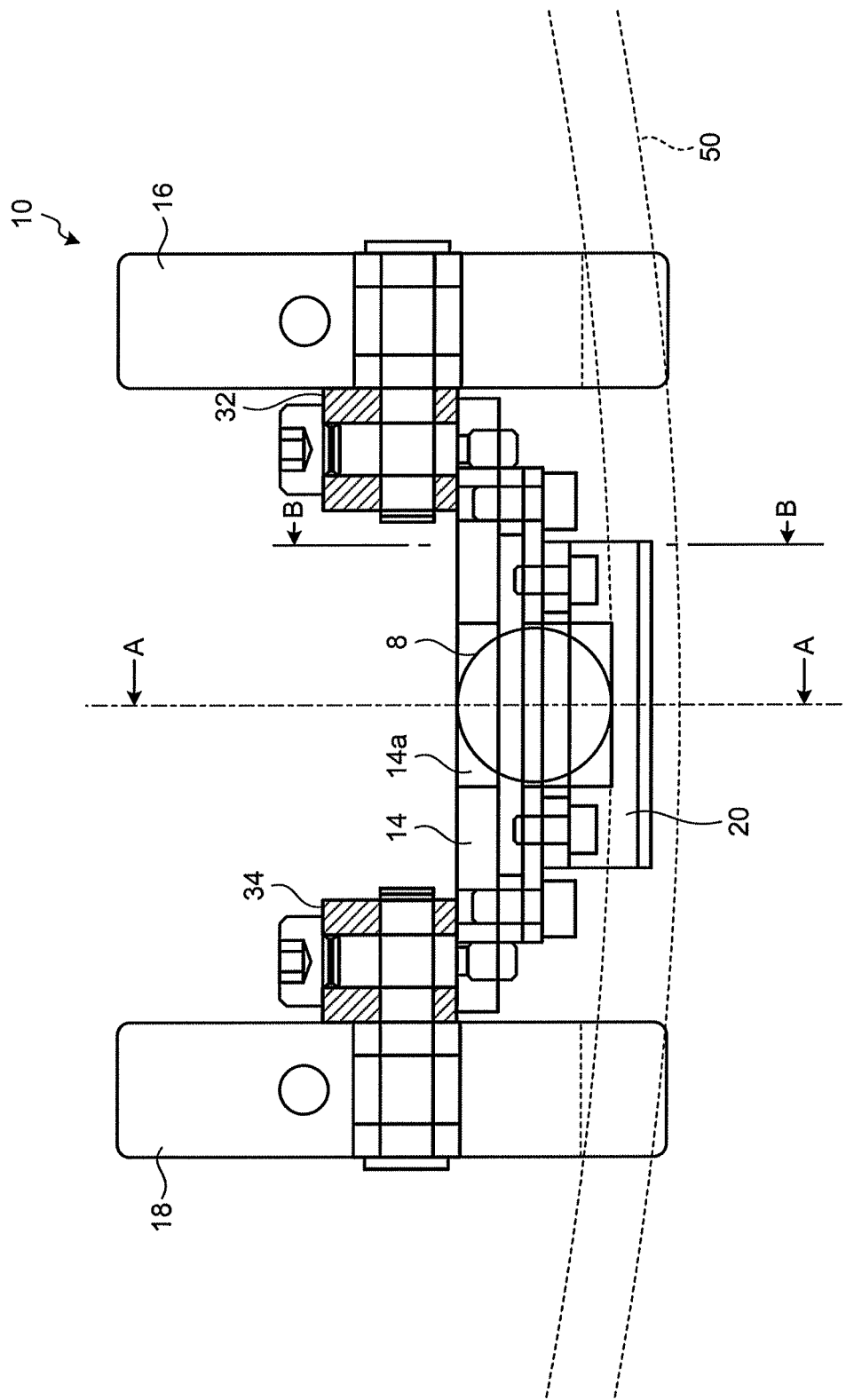
FIG. 1 is a front view illustrating a schematic configuration of a target holding jig according to one embodiment of the present invention.
Figure 2:
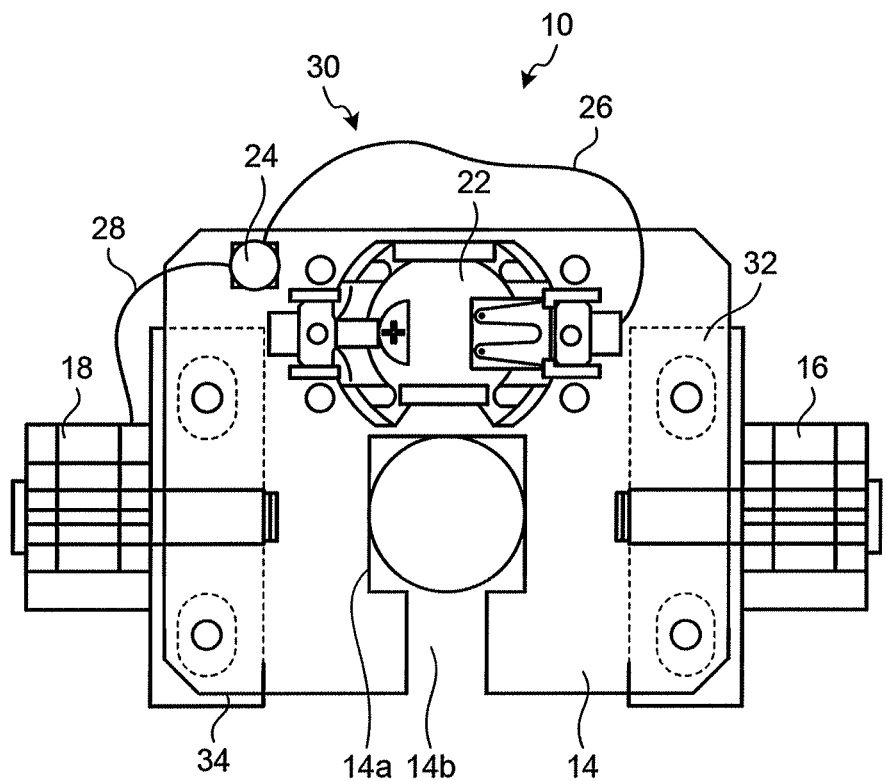
FIG. 2 is a top view of the target holding jig illustrated in FIG. 1.
Figure 3:
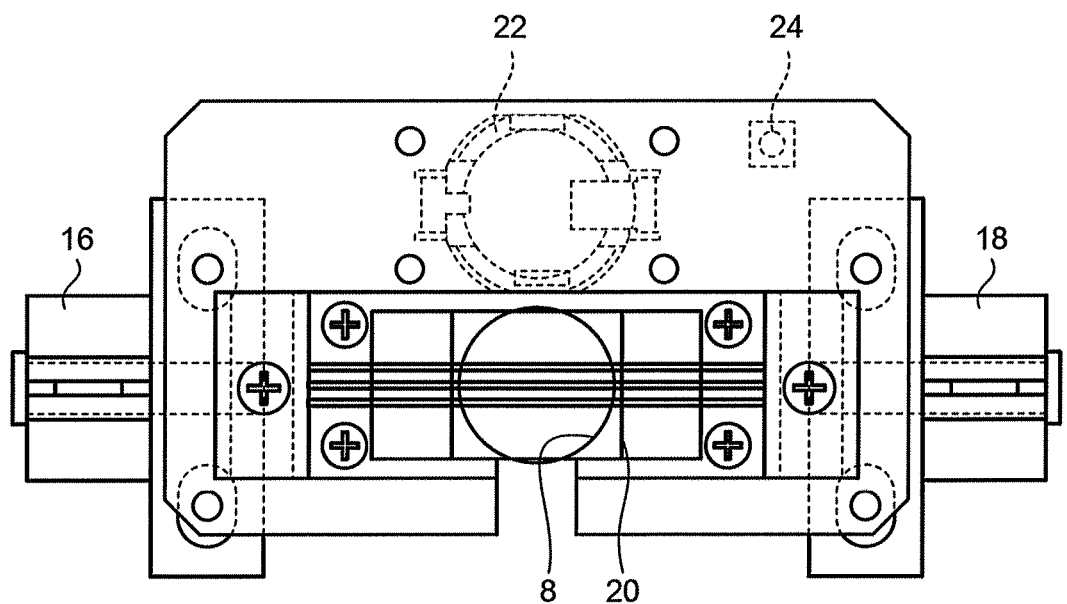
FIG. 3 is a bottom view of the target holding jig illustrated in FIG. 1.
Figure 4:
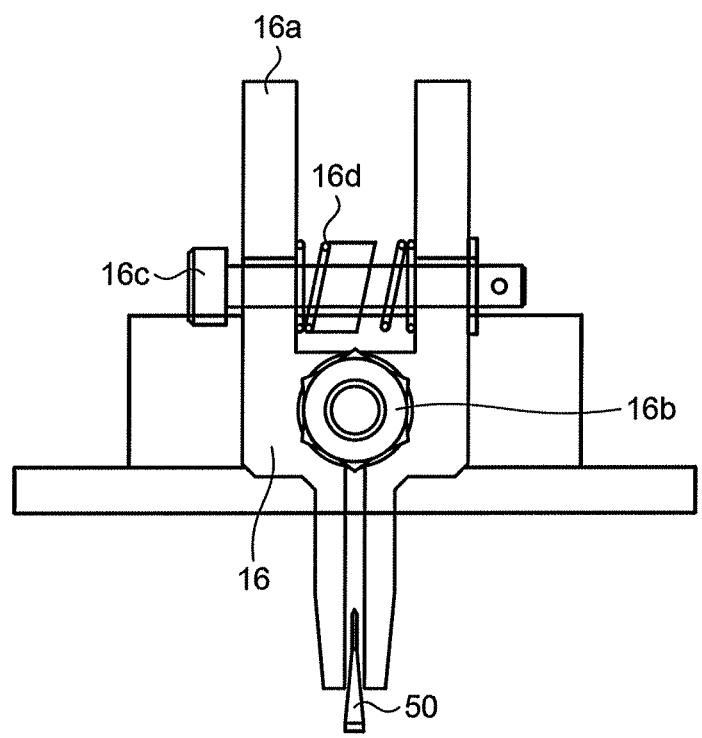
FIG. 4 is a side view illustrating a schematic configuration of a coupling portion of the target holding jig illustrated in FIG. 1.
Figure 5:
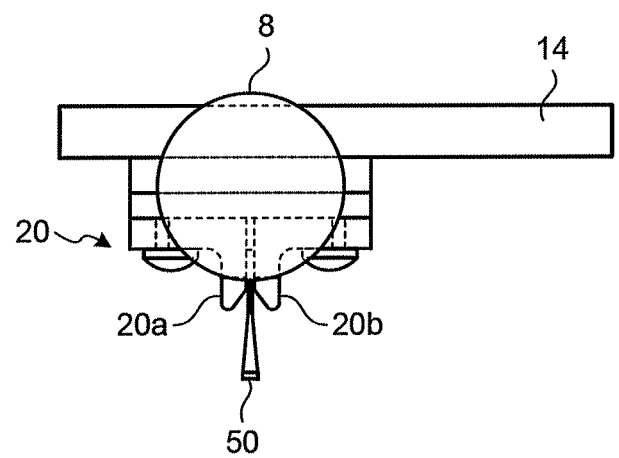
FIG. 5 is a cross-sectional view of a schematic configuration taken along the line A-A of FIG. 1.
Figure 6:
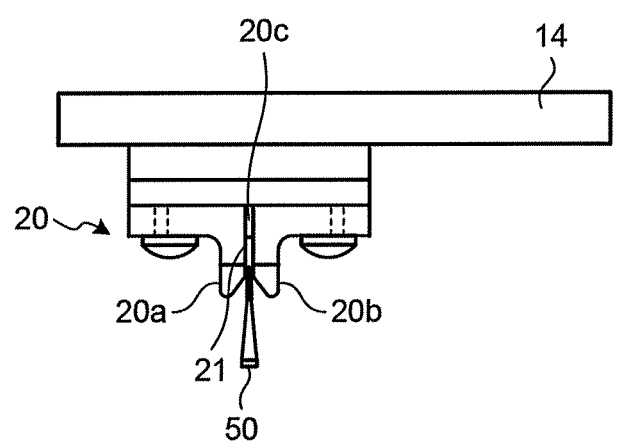
FIG. 6 is a cross-sectional view of a schematic configuration taken along the line B-B of FIG. 1.
Figure 7:
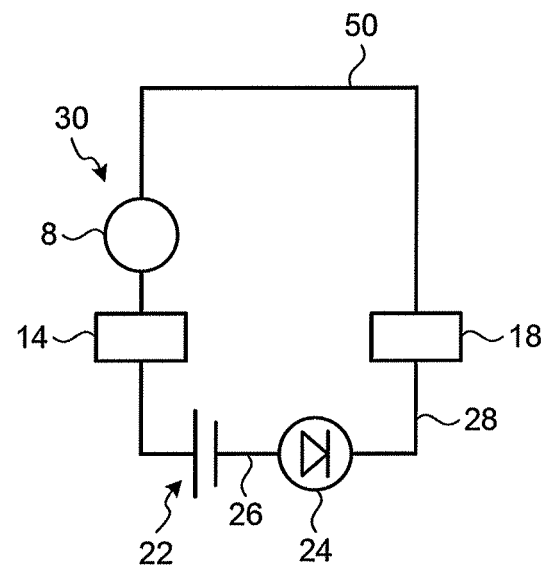
FIG. 7 is a schematic view illustrating a circuit configuration of a detection unit.

FIG. 1 is a front view illustrating a schematic configuration of the target holding jig according to one embodiment of the present invention. FIG. 2 is a top view of the target holding jig illustrated in FIG. 1. FIG. 3 is a bottom view of the target holding jig illustrated in FIG. 1. FIG. 4 is a side view illustrating a schematic configuration of a coupling portion of the target holding jig illustrated in FIG. 1. FIG. 5 is a cross-sectional view of a schematic configuration taken along the line A-A of FIG. 1. FIG. 6 is a cross-sectional view of a schematic configuration taken along the line B-B of FIG. 1. FIG. 7 is a schematic view illustrating a circuit configuration of a detection unit.

A target holding jig 10 is configured to hold a target 8, and be removably coupled to an object 50 to be measured. Here, the target 8 is part of the measurement apparatus described below, and includes a reflection mechanism for reflecting measurement light. Specifically, the target 8 is a substantially spherical member partially formed with a notch, and a reflector for reflecting the measurement light is disposed in the notch. The object 50 to be measured according to the present embodiment represents the ring-shaped seal fin of the steam turbine (hereinafter, object 50 to be measured is also referred to as seal fin 50).

The target holding jig 10 includes a supporting portion 14, coupling portions 16 and 18, a guide portion 20, a battery holder 22, a light emitting unit 24, and wires 26 and 28.

The supporting portion 14 is a plate-shaped member defined as a base of the target holding jig 10. The supporting portion 14 has an opening 14a formed in a surface having a largest area (in a surface facing the object 50 to be measured, when the supporting portion 14 faces the object (seal fin) 50 to be measured as illustrated in FIG. 1). The opening 14a receives the target 8 inserted therein, so that the target 8 is held by the target holding jig 10. Additionally, the supporting portion 14 is formed with a notch 14b connected to the opening 14a and extending to a side surface of the supporting portion 14. The notch 14b is provided to secure an area for input and reflection of the measurement light in the target 8. The formation of the notch 14b also allows a user to readily confirm the relative positions of the target 8 and the object 50 to be measured through the notch 14b.

In the supporting portion 14, as illustrated in FIG. 1, the guide portion 20 is disposed on the surface facing the object (seal fin) 50 to be measured, and the battery holder 22, the light emitting unit 24, and the wires 26 and 28 are disposed on the surface on the opposite side. Additionally, the supporting portion 14 has the coupling portions 16 and 18 disposed respectively on a pair of side surfaces of side surfaces located between the surface facing the object 50 to be measured and the surface on the opposite side. It is noted that the side surfaces on which the coupling portions 16 and 18 are disposed are not formed with the notch 14b.

Further, the supporting portion 14 is made of a conductive material such as a metal. The supporting portion 14 is electrically connected to one electrode of the battery holder 22, and electrically connected to the target 8. Additionally, the supporting portion 14 is electrically connected to the coupling portions 16 and 18, and the wires 26 and 28 through other members.

The coupling portions 16 and 18 constitute a mechanism for coupling with the object 50 to be measured. As illustrated in FIG. 1, in the target holding jig 10, the coupling portion 16 is disposed at one end of the supporting portion 14, and the coupling portion 18 is disposed at the other end of the supporting portion 14. That is, in the target holding jig 10, the coupling portions 16 and 18 are disposed at positions where the opening 14a of the supporting portion 14 is positioned between the coupling portions. The coupling portion 16 is fixed to the supporting portion 14 through an insulation portion 32. Similarly, the coupling portion 18 is also fixed to the supporting portion 14 through an insulation portion 34. The insulation portion 32 is disposed in the fixed portion between the coupling portion 16 and the supporting portion 14, and the insulation portion 34 is disposed in the fixed portion between the coupling portion 18 and the supporting portion 14, so that a current does not flow. It is noted that the fixed portion between the coupling portion 16 and the supporting portion 14 and the fixed portion between the coupling portion 18 and the supporting portion 14 are fixed with a fastening mechanism such as a screw, while maintaining a state in which a current does not flow.

In the target holding jig 10 according to the present embodiment, the target 8 inserted into the opening 14a abuts on the guide portion 20 and is held in the opening 14a, and the target 8 is thereby held at a predetermined position in the opening 14a. Therefore, the target 8 can be held in a direction in which the measurement light can be input to and reflected from the target 8, while being brought into contact with the object to be measured by the guide portion 20.

Next, a configuration of the coupling portion 16 will be described using FIG. 4. Since the coupling portion 18 is different from the coupling portion 16 only in positional disposition, the description of the coupling portion 18 is omitted. The coupling portion 16 has a mechanism similar to a so-called clothes pin, and includes a holding portion 16a, a pivot 16b, a hinge pin 16c, and a spring 16d. The holding portion 16a includes two members turned about the pivot 16b. The pivot 16b is connected to the coupling portion 16, and turnably supports the holding portion 16a. The hinge pin 16c is inserted into a part of the holding portion 16a on the opposite side to the object 50 to be measured relative to the pivot 16b. The hinge pin 16c is configured to be prevented from being removed from the holding portion 16a by a retaining pin not illustrated. The spring 16d is inserted on the hinge pin 16c, and is disposed between the two members of the holding portion 16a. The spring 16d presses the two members of the holding portion 16a in a direction in which the two members are opened. The coupling portion 16 is configured such that when a force is applied thereto in a direction in which the part of the holding portion 16a on the opposite side to the object 50 to be measured relative to the pivot 16b is opened by the spring 16d, a groove is narrowed which is formed in the holding portion 16a on the side of the object 50 to be measured. Therefore, the coupling portion 16 holds the object 50 to be measured in the groove, and is thereby coupled to the object 50 to be measured.

Additionally, the coupling portion 16 is configured such that when the holding portion 16a on the side on which the spring 16d is disposed is closed, the coupling portion 16 can be removed from the object 50 to be measured.

The coupling portion 16 may be formed with a ridge and groove mechanism or may have a member such as rubber for slip prevention disposed at an end of the holding portion 16a on the side of the object 50 to be measured. It is noted that the coupling portion 16 needs to have a function which allows a current to flow between the coupling portion 16 and the object 50 to be measured, and when the rubber is provided, one of the two members is preferably provided with no rubber, or provided with a conductive rubber.

In the target holding jig 10 according to the present embodiment, the coupling portions 16 and 18 have a mechanism for holding the object 50 to be measured, but the mechanism is not limited to this. The target holding jig 10 may have a mechanism in which the coupling portions 16 and 18 are coupled to the object 50 to be measured by magnetic attraction or the like.

As illustrated in FIG. 1, the guide portion 20 is disposed on a surface of the supporting portion 14 facing the object (seal fin) 50 to be measured so as to be positioned collinearly with the coupling portions 16 and 18. The guide portion 20 includes two members extending collinearly with the coupling portions 16 and 18, and is formed with a linear groove 21 positioned collinearly with the grooves formed in the holding portions of the coupling portions 16 and 18. The target holding jig 10 can hold the object 50 to be measured in the grooves formed in the holding portions of the coupling portions and the groove 21 of the guide portion 20. Thus, while the target holding jig 10 holds the object 50 to be measured, the guide portion 20 can bring the target 8 into contact with the object 50 to be measured at or near a position where the target 8 is most protruded toward the object 50 to be measured, as illustrated in FIG. 5. It is noted that the guide portion 20 is made of an insulating material such as a phenolic resin.

As illustrated in FIGS. 5 and 6, the guide portion 20 has end parts 20a and 20b which are the end of the groove 21 on the side of the object 50 to be measured. The end parts 20a and 20b have an inclined shape with the width therebetween increasing toward the object 50 to be measured and decreasing toward the supporting portion 14. Therefore, the guide portion 20 facilitates insertion of the object 50 to be measured into the groove 21.

Here, the guide portion 20 has two members constituting the guide portion 20, and the two members are configured to be removably connected to the supporting portion 14. In the guide portion 20, a spacer 20c is disposed at an area of the groove 21 into which the object 50 to be measured is not inserted. The guide portion 20 is configured such that when the two members are mounted to the supporting portion 14, the spacer 20c is disposed between the two members, and thereby the width of the groove 21 can be defined as the width of spacer 20c. Therefore, in the guide portion 20, the groove 21 can have a predetermined width. Additionally, the guide portion 20 is configured such that, when the thickness of the spacer 20c is changed, the width of the groove 21 can be thereby changed. It is noted that the groove 21 has an interval larger than the thickness of the object 50 to be measured.

The battery holder 22 is installed at the supporting portion 14, and has a battery not illustrated mounted on it. The battery holder 22 has one electrode electrically connected to the supporting portion 14, and the other electrode connected to the wire 26. The light emitting unit 24 is installed at the supporting portion 14. The light emitting unit 24 is a light emitting diode or the like, and is an element emitting light when a current flows therethrough. The wire 26 connects between the other electrode of the battery holder 22 and the light emitting unit 24. The wire 28 connects between the light emitting unit 24 and the coupling portion 18.

Here, the target holding jig 10 has a detection unit 30 composed of the target 8, the supporting portion 14, the coupling portion 18, the battery holder 22, and the wires 26 and 28. The detection unit 30 forms one series circuit, including the light emitting unit 24 and the object 50 to be measured. Specifically, as illustrated in FIG. 7, the detection unit 30 forms a circuit including the target 8, the supporting portion 14, the coupling portion 18, the battery holder 22, and the wires 26 and 28, connected in series in the order of the target 8, the supporting portion 14, the battery holder 22, the wire 26, the light emitting unit 24, the wire 28, and the coupling portion 18. Therefore, in the detection unit 30, when the coupling portion 18 and the object 50 to be measured are brought into contact with each other, and the target 8 and the object 50 to be measured are brought into contact with each other, the coupling portion 18, the object 50 to be measured, and the target 8 are connected in series, and one closed circuit is formed. The closed circuit allows a current to flow from the battery holder 22 with the battery mounted on it, and as the current flows through the light emitting unit 24, the light emitting unit 24 emits light. Additionally, in the detection unit 30, when any of the coupling portion 18 and the target 8 is out of contact with the object 50 to be measured, a current does not flow, and the light emitting unit 24 does not emit light.

The target holding jig 10 is configured as described above, and the target 8 is supported by the supporting portion 14, the object 50 to be measured is held in the coupling portions 16 and 18, and the guide portion 20, so that the target holding jig 10 can be coupled with the object 50 to be measured. Therefore, the target holding jig 10 is configured such that the guide portion 20 can regulate the position of the object 50 to be measured. Specifically, the guide portion 20 holds the object 50 to be measured therein to regulate a contact position of the target 8 with the object 50 to be measured, and restrict the movement of the target 8 in a short side direction of the end surface of the object 50 to be measured. Therefore, a contact position between the object 50 to be measured and the target 8 can be maintained within a predetermined range, and the positional shift of the contact position between the object 50 to be measured and the target 8 can be reduced. Accordingly, when the user uses the target holding jig 10 according to the present embodiment, measurement using the target 8 can be performed highly accurately.

Further, in the target holding jig 10, when the two coupling portions 16 and 18 hold the supporting portion 14 therebetween, and an extending direction of the groove 21 of the guide portion 20 is aligned with a line connecting the coupling portions 16 and 18, the object 50 to be measured coupled by the coupling portions 16 and 18 can be readily guided to the groove 21. Therefore, the object 50 to be measured and the target 8 can be more readily brought into contact with each other. Additionally, when the extending direction of the groove 21 of the guide portion 20 is aligned with the line connecting the coupling portions 16 and 18, the positional shift between the object 50 to be measured and the target 8 in a direction perpendicular to the extending direction of the groove 21 can be reduced.

Further, the target holding jig 10 is configured such that the detection unit 30 can determine whether the target 8 has been securely brought into contact with the object 50 to be measured. Therefore, while the object 50 to be measured and the target 8 are out of contact with each other, measurement is inhibited, so that the measurement using the target 8 can be performed highly accurately. Additionally, in the target holding jig 10, the detection unit 30 is formed as a circuit configured such that, when the target 8 and the coupling portion 18 are brought into contact with the object 50 to be measured, a current flows, so that the user can detect whether the target 8 and the object 50 to be measured are in contact with each other simply by mounting the target holding jig 10 to the object 50 to be measured.

Further, the light emitting unit 24 is provided, and when the detection unit 30 detects the contact between the target 8 and the object 50 to be measured, a current flows and the light emitting unit 24 emits light. Thus, the user can visually recognize the contact between the target 8 and the object 50 to be measured.

In the target holding jig 10 of the present embodiment, the method is employed which notifies the user of the contact between the target 8 and the object 50 to be measured by causing the light emitting unit 24 to emit light, but the method is not limited to the light emission. For the target holding jig 10, as the notification method, various mechanisms for appealing to the user's sense can be employed, and, for example, a sound output unit for outputting sound may be provided in place of the light emitting unit 24.

Figure 8:
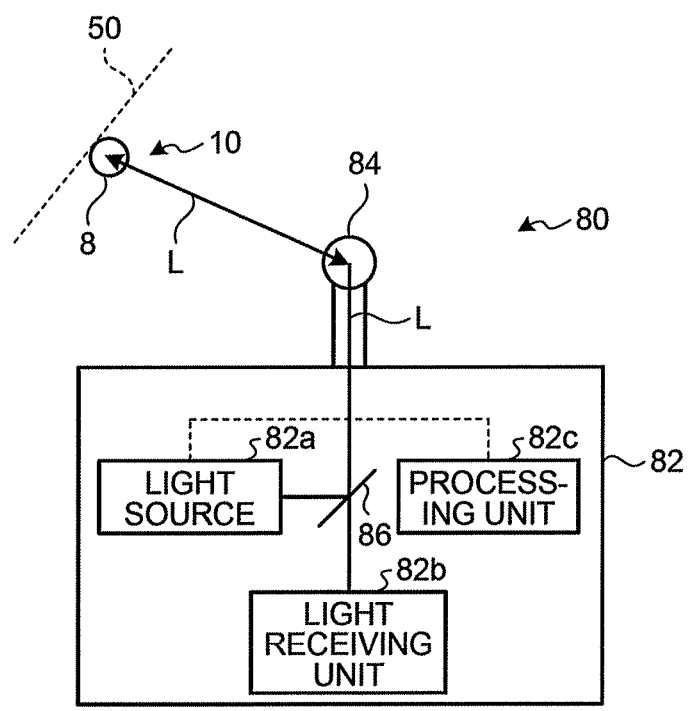
FIG. 8 is a schematic view illustrating a schematic configuration of a measurement apparatus with the target holding jig.
Figure 9:
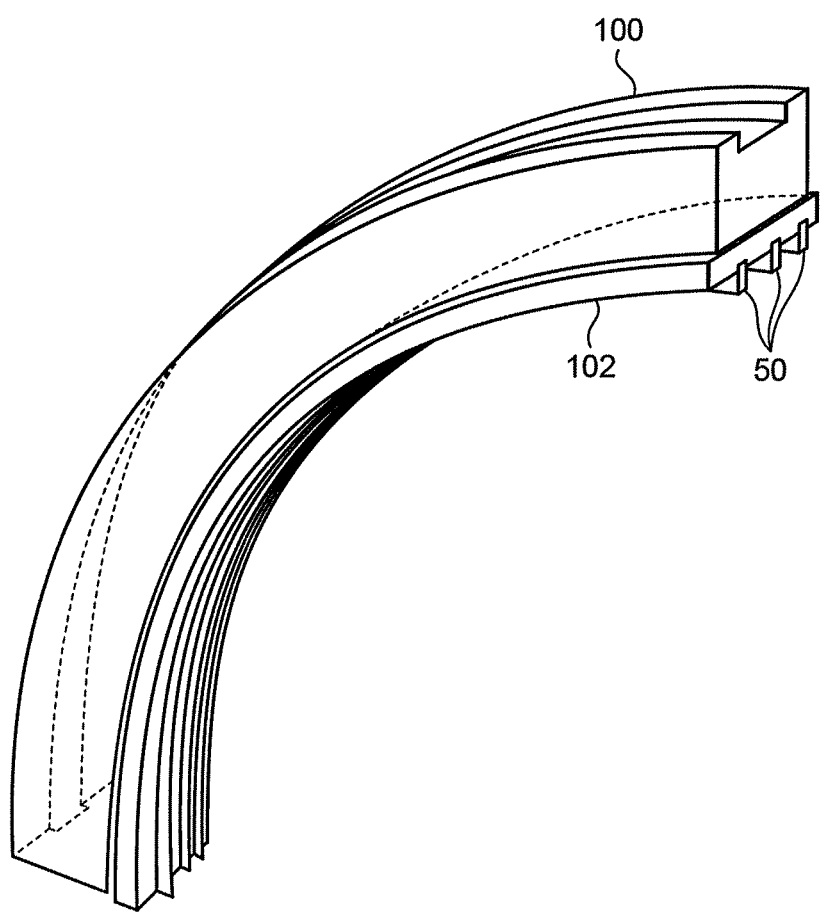
FIG. 9 is a perspective view illustrating a schematic configuration of an object to be measured.
Figure 10:
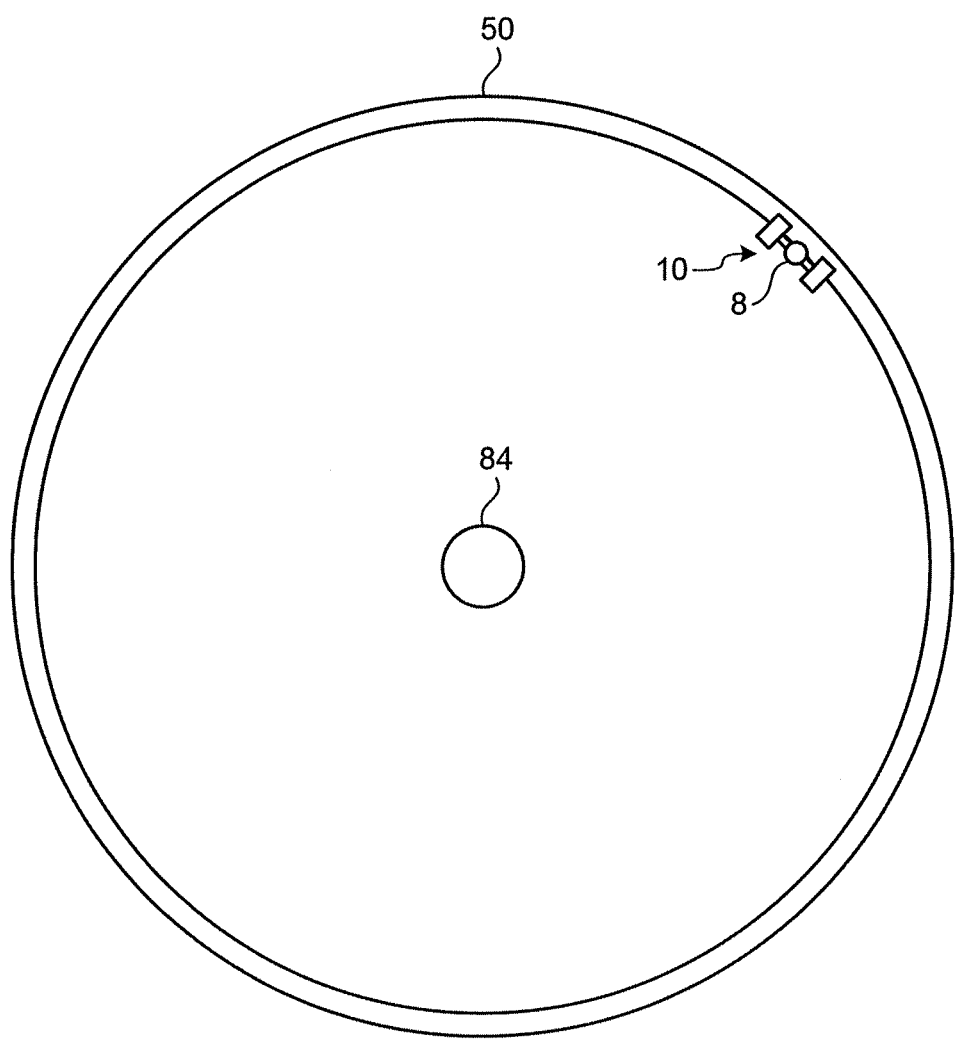
FIG. 10 is a schematic view illustrating a positional relationship between the object to be measured and the target holding jig during measurement.

Next, the measurement apparatus with the target holding jig according to the present invention will be described using FIGS. 8 to 10. FIG. 8 is a schematic view illustrating a schematic configuration of the measurement apparatus with the target holding jig. FIG. 9 is a perspective view illustrating a schematic configuration of the object to be measured. FIG. 10 is a schematic view illustrating a positional relationship between the object to be measured and the target holding jig during measurement.

As illustrated in FIG. 8, a measurement apparatus 80 with the target holding jig 10 includes the target 8, the target holding jig 10, and a measurement apparatus body 82. As described above, the target 8 is held by the target holding jig 10, and is brought into contact with the object (seal fin) 50 to be measured, by the target holding jig 10, during measurement.

The measurement apparatus body 82 includes a light source 82a, a light receiving unit 82b, and a processing unit 82c. Additionally, the measurement apparatus body 82 is provided with a head 84 and an optical system 86 for irradiating the target 8 with the measurement light, and guiding the light reflected from the target 8 to the measurement apparatus body 82.

The light source 82a outputs the measurement light L. It is noted that the light source 82a outputs, for example, a laser beam having a predetermined wavelength as the measurement light L. The light receiving unit 82b is a light receiving element for detecting the light reaching the light receiving unit 82b. The light receiving unit 82b detects light having a wavelength of the measurement light L. The processing unit 82c controls the operation of each unit of the measurement apparatus 80. Additionally, the processing unit 82c analyzes a detection result of the light receiving unit 82b and information about the measurement light L output from the light source 82a to measure a distance to the target 8, and removes a difference generated according to the shape of the target 8 by calculation processing to thereby measure a distance to the object 50 to be measured.

The head 84 is disposed in a path through which the measurement light L output from the light source 82a passes, and adjusts an irradiation direction of the measurement light L. The optical system 86 is disposed between the light source 82a and the head 84, and between the light receiving unit 82b and the head 84, outputs the light output from the light source 82a toward the head 84, and guides the light input to the head 84 to the light receiving unit 82b.

In the measurement apparatus 80, the target holding jig 10 is installed at a measurement position of the object 50 to be measured. Here, as illustrated in FIG. 9, the object (seal fin) 50 to be measured according to the present embodiment is installed at a seal ring 102 disposed on the inside of a seal mounting ring 100. The seal fin 50 projects radially inward from the seal ring 102. Additionally, a plurality of seal fins 50 are provided at the seal ring 102. Since the steam turbine includes a plurality of seal rings 102, a number of the seal fins 50 corresponding to the number of the seal rings 102 are disposed. As illustrated in FIG. 10, the measurement apparatus 80 is configured such that the target holding jig 10 holding the target 8 is installed in a circumferential direction of the seal fin 50 disposed in a ring form.

The measurement apparatus 80 outputs the measurement light L from the measurement apparatus body 82 to the target 8 through the head 84, receives the light reflected from the target 8 through the head 84 by the measurement apparatus body 82, analyzes a result of the received light, and can thereby measure the distance to the object 50 to be measured. Additionally, the radius of the seal fin 50 can be measured by moving the target holding jig 10 on the seal fin 50 and performing the measurement at a plurality of positions on the seal fin 50.

Further, when the seal fin is selected as the object 50 to be measured as described in the present embodiment, it is necessary to perform the measurement at a large number of positions. However, when the removable target holding jig 10 is used to perform the measurement, while moving the target 8 installed at the object 50 to be measured, the measurement is allowed with a reduced number of targets 8. Additionally, since the target holding jig 10 is provided with the guide portion 20, when mounting the target holding jig 10, the target 8 can be highly accurately brought into contact with the object 50 to be measured. Further, the target holding jig 10 is configured such that the detection unit 30 and the light emitting unit 24 can notify that the target 8 has been brought into contact with the object 50 to be measured, so that the user is allowed to readily install the target 8.

REFERENCE SIGNS LIST

8 TARGET
10 TARGET HOLDING JIG
14 SUPPORTING PORTION
14a OPENING
14b NOTCH
16, 18 COUPLING PORTION
16a HOLDING PORTION
16b PIVOT
16c HINGE PIN
16d SPRING
20 GUIDE PORTION
20a, 20b END PART
20c SPACER
21 GROOVE
22 BATTERY HOLDER
24 LIGHT EMITTING UNIT
26, 28 WIRE
32, 34 INSULATION PORTION
50 SEAL FIN (OBJECT TO BE MEASURED)
80 MEASUREMENT APPARATUS
82 MEASUREMENT APPARATUS BODY
82a LIGHT SOURCE
82b LIGHT RECEIVING UNIT
82c PROCESSING UNIT
84 HEAD
86 OPTICAL SYSTEM
100 SEAL MOUNTING RING
102 SEAL RING

The invention claimed is:

1. A target holding jig for holding a target including a reflection mechanism for reflecting measurement light emitted from a light source, and bringing the target and an end surface of an object to be measured into contact with each other, the target holding jig comprising:
    a supporting portion configured to support the target being in contact with the object to be measured;
    a guide portion disposed on a side of the supporting portion facing the object to be measured, the guide portion being configured to regulate a contact position of the target with the object to be measured in a short side direction of the end surface of the object to be measured, and configured to restrict the movement of the target in the short side direction of the end surface of the object to be measured; and
    a coupling portion fixed to the supporting portion, the coupling portion including a holding portion defining a groove for removably coupling to the object to be measured,
    wherein the supporting portion includes an opening formed in a surface facing the object to be measured so as to accommodate the target therein, and
    wherein the guide portion is disposed on the surface of the supporting portion facing the object to be measured so as to be positioned collinearly with the coupling portion, and includes two members extending collinearly with the coupling portion to form a linear groove positioned collinearly with the groove of the coupling portion.

2. The target holding jig according to claim 1, wherein the coupling portion can be coupled to the object to be measured by holding the object to be measured with the holding portion.

3. The target holding jig according to claim 1, further comprising:
    a detection unit configured to detect contact between the target and the object to be measured; and
    a notification unit configured to notify that the detection unit has detected the contact between the target and the object to be measured.

4. The target holding jig according to claim 3, wherein the detection unit includes a power source connected to the target and the coupling portion, and the target, the coupling portion, the power source, and the notification unit are connected in series, and
    when the target and the coupling portion are brought into contact with the object to be measured, the target, the coupling portion, the power source, the notification unit, and the object to be measured form a closed circuit.

5. The target holding jig according to claim 4, further comprising:
an insulation portion which is disposed between the supporting portion and the coupling portion, and configured to insulate between the supporting portion and the coupling portion.

6. The target holding jig according to claim 3, wherein the notification unit is a light emitting unit configured to emit light.

7. A measurement apparatus comprising:
the target holding jig according to claim 1;
a target held by the target holding jig; and
a measurement apparatus body including:
  a light source configured to irradiate the target with measurement light;
  a light receiving unit configured to receive the light reflected from the target; and
  a processing unit configured to analyze a result of the light received by the light receiving unit.

* * * * *